No. 694,598. Patented Mar. 4, 1902.
A. ARMITAGE.
GRAIN DRILL.
(Application filed July 24, 1901.)
(No Model.) 6 Sheets—Sheet 5.
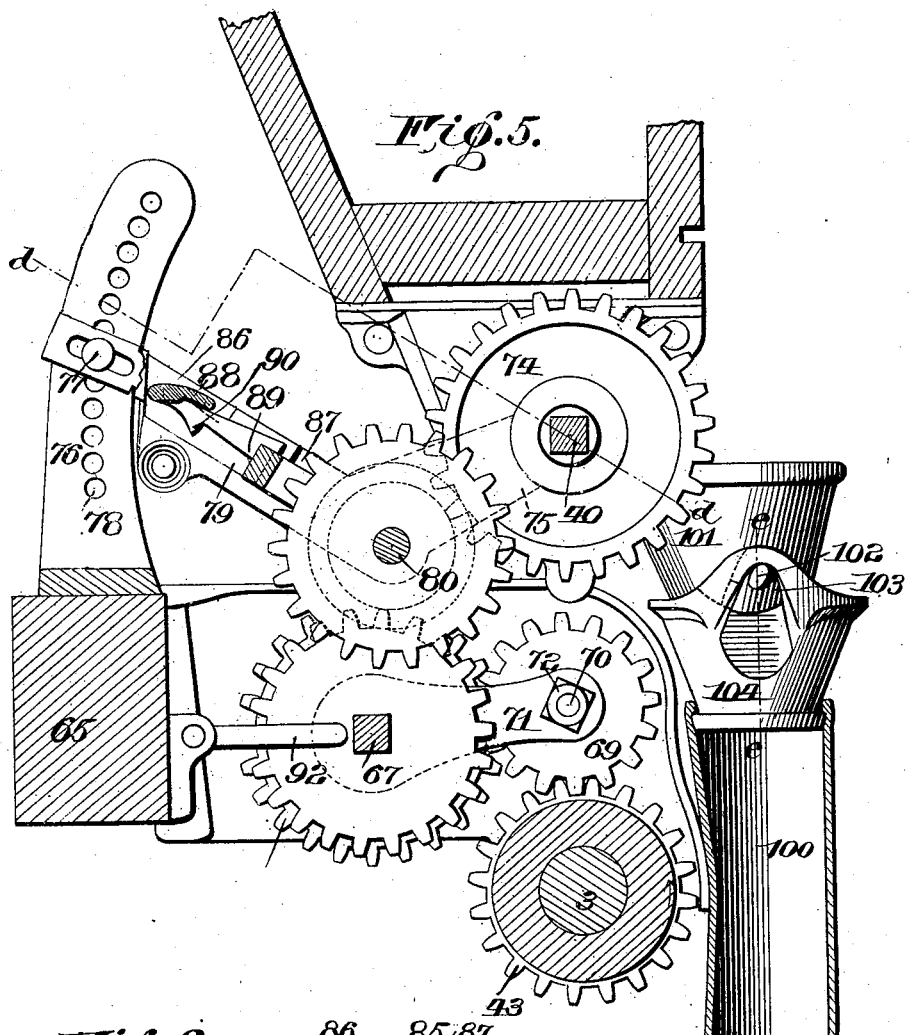
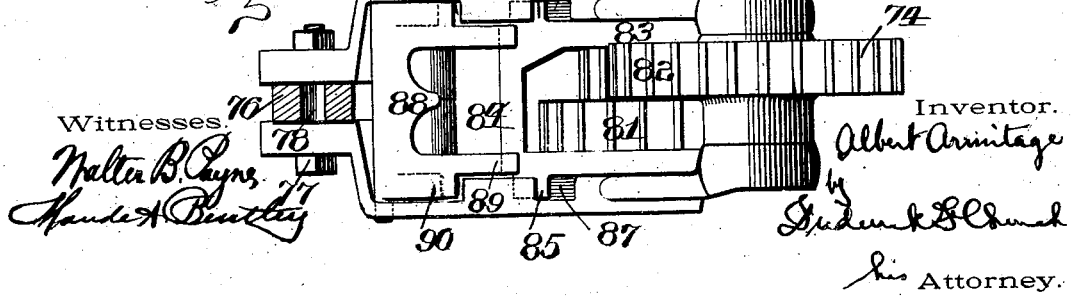
Witnesses. Inventor.
Albert Armitage
his Attorney.

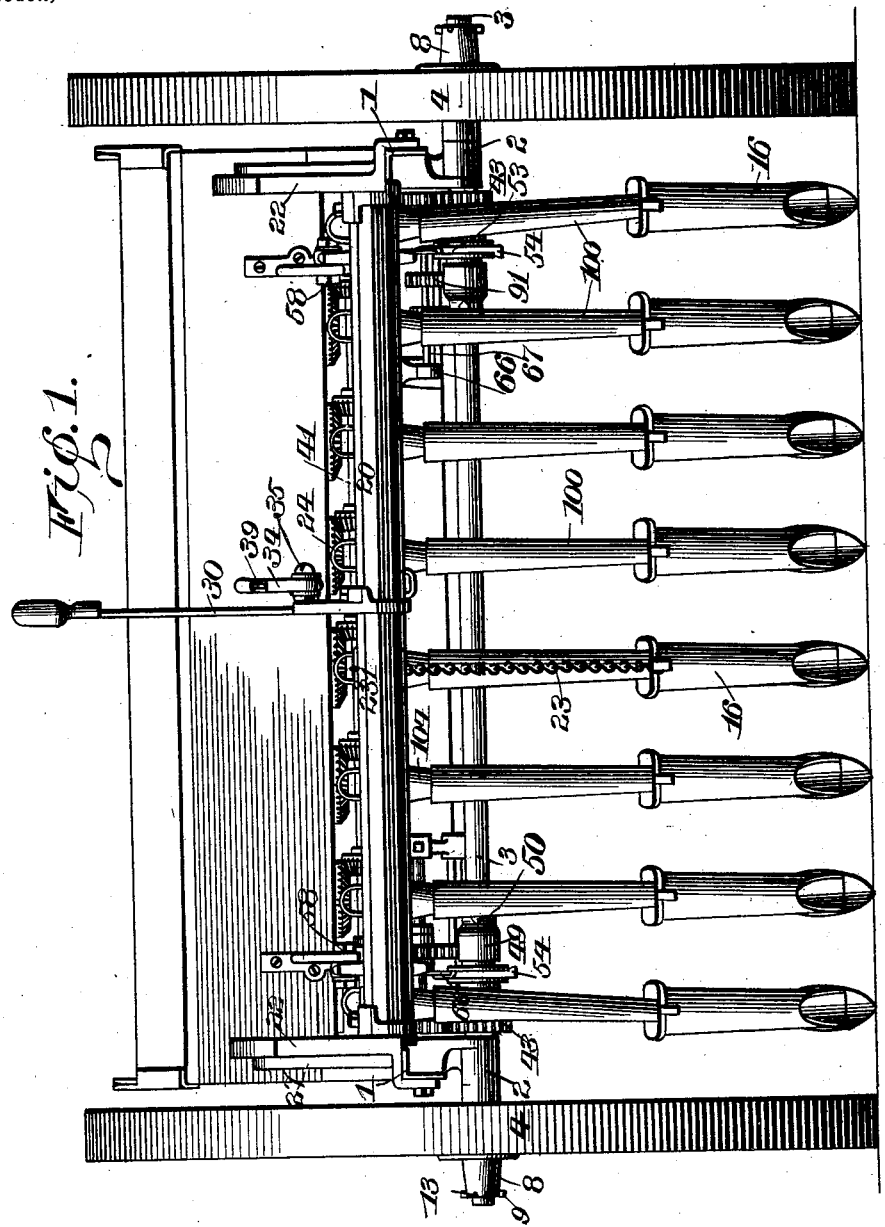

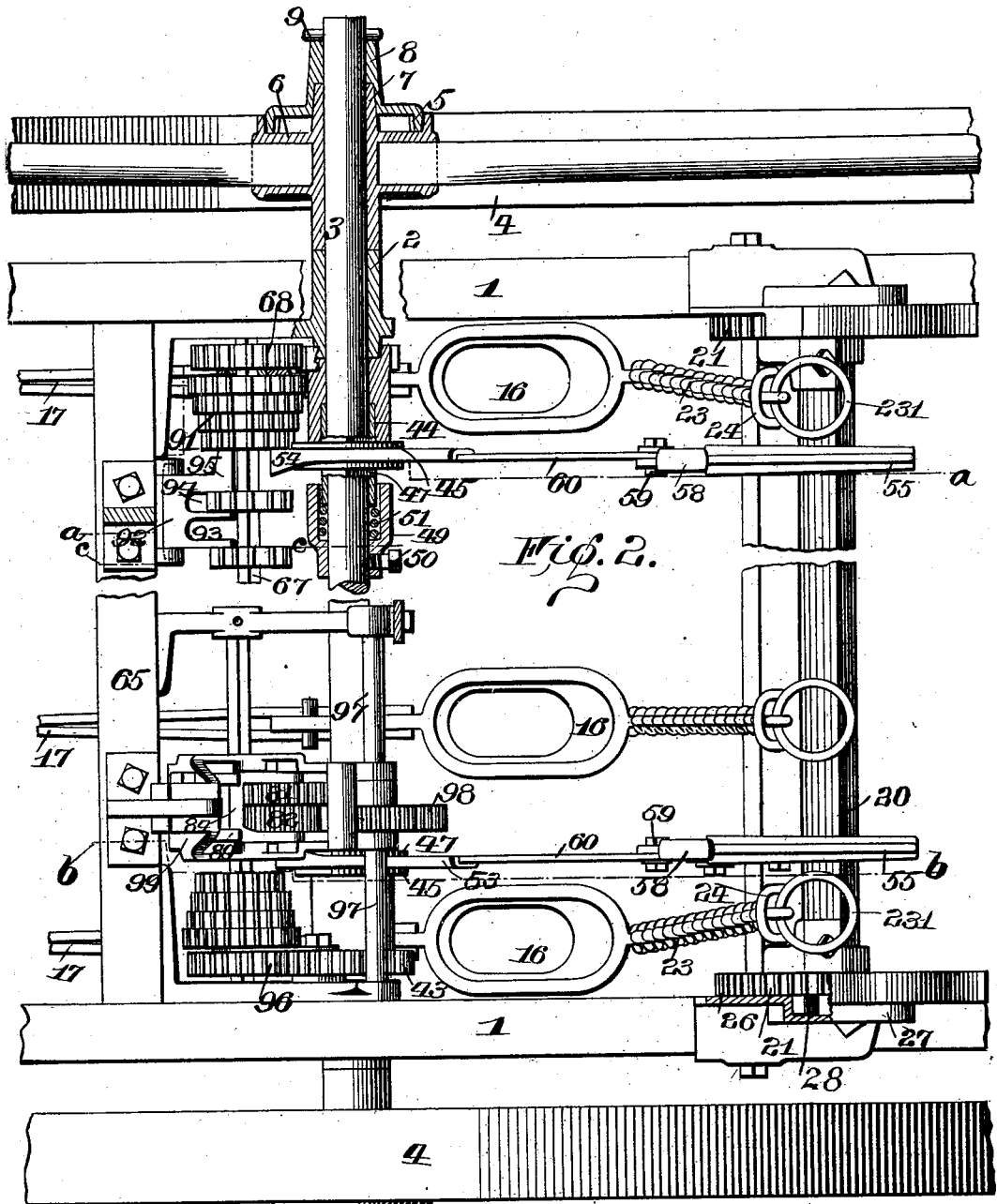

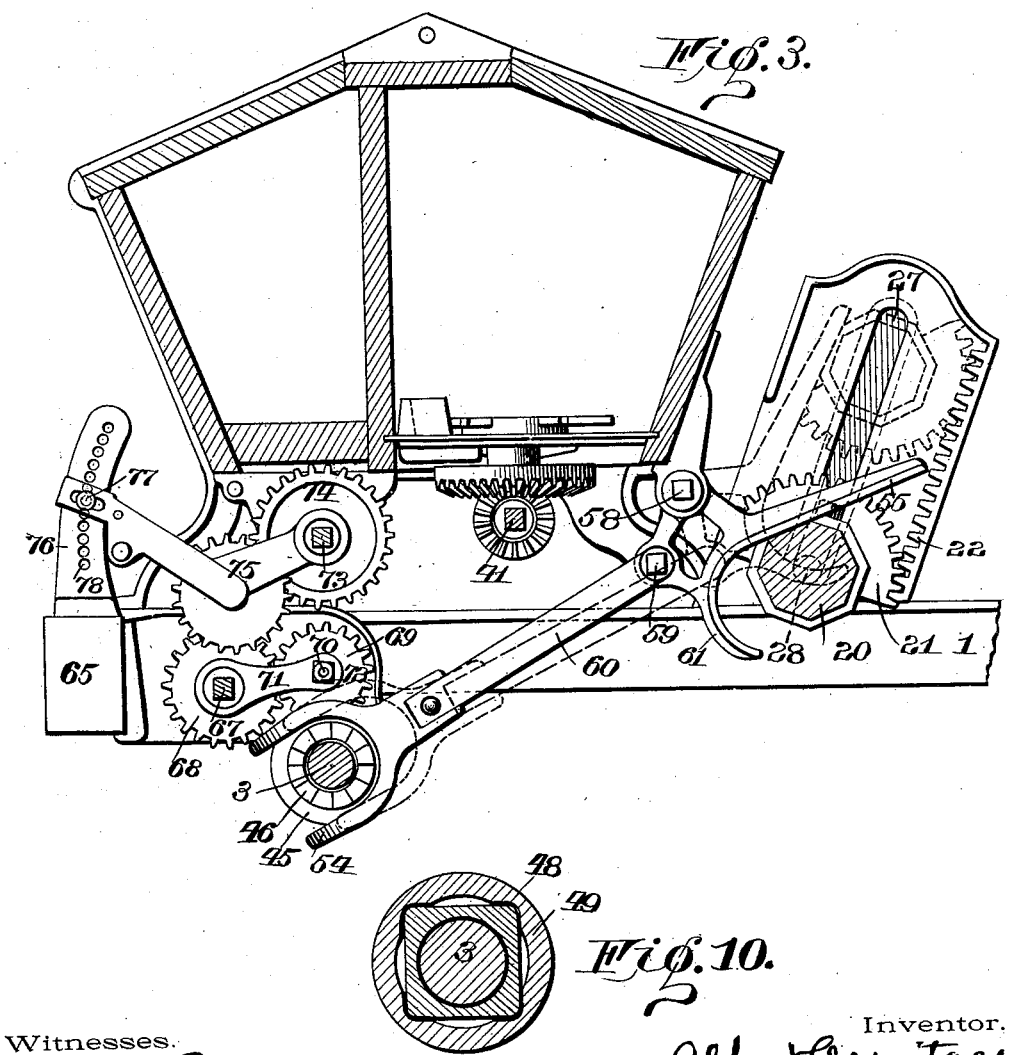

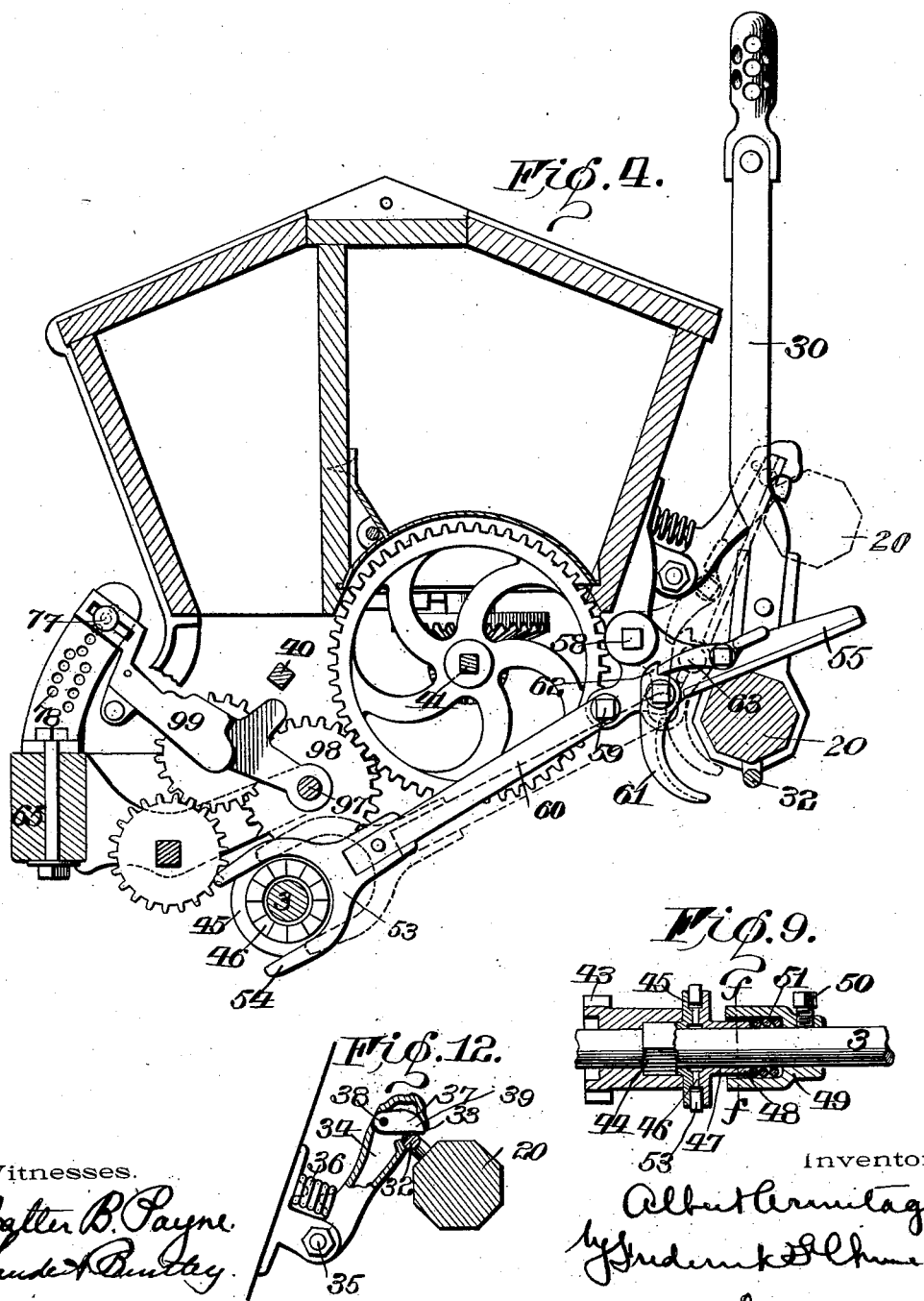

No. 694,598. Patented Mar. 4, 1902.
A. ARMITAGE.
GRAIN DRILL.
(Application filed July 24, 1901.)
(No Model.) 6 Sheets—Sheet 6.
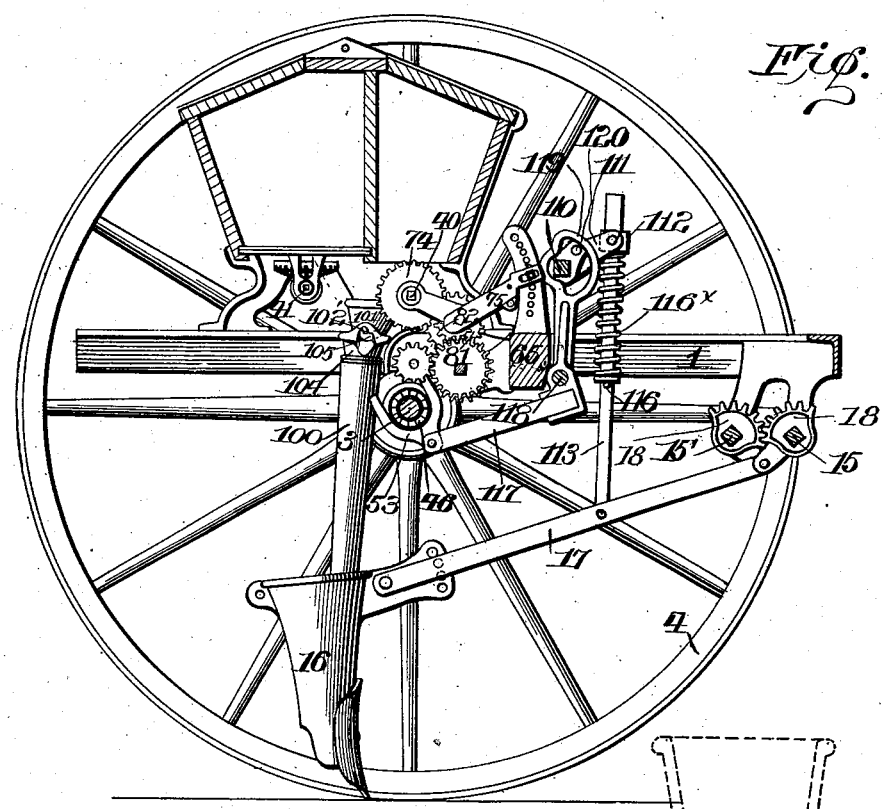
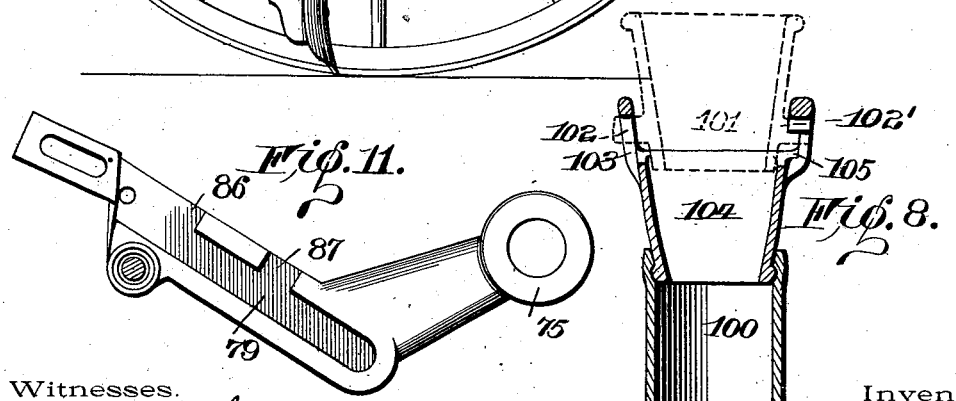
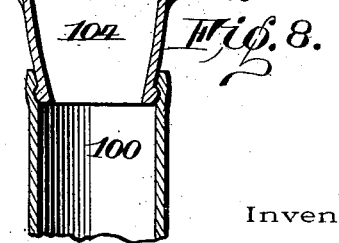
Witnesses. Inventor.

UNITED STATES PATENT OFFICE.

ALBERT ARMITAGE, OF FAIRPORT, NEW YORK, ASSIGNOR TO ONTARIO DRILL COMPANY, OF DESPATCH, NEW YORK, A CORPORATION OF NEW YORK.

GRAIN-DRILL.

SPECIFICATION forming part of Letters Patent No. 694,598, dated March 4, 1902.

Application filed July 24, 1901. Serial No. 69,553. (No model.)

*To all whom it may concern:*

Be it known that I, ALBERT ARMITAGE, of Fairport, in the county of Monroe and State of New York, have invented certain new and useful Improvements in Grain-Drills; and I do hereby declare the following to be a full, clear, and exact description of the same, reference being had to the accompanying drawings, forming a part of this specification, and to the reference-numerals marked thereon.

My present invention relates to agricultural machines, and particularly to that class known as "grain-drills" or "seeding-machines," in which a predetermined quantity of grain is deposited at regular intervals, together with a supply of fertilizing material; and my invention has for its object to provide certain improvements in the construction whereby the feeding devices for the seed and fertilizer may be operated independently or the quantities thereof regulated as desired and also to provide a suitable clutch mechanism to automatically arrest the operation of said feeding devices when the hoes are elevated out of contact with the ground.

To these and other ends the invention consists in certain improvements and combinations of parts, all as will be hereinafter fully described, the novel features being pointed out in the claims at the end of this specification.

In the drawings, Figure 1 is a rear elevation of a grain-drill or seeding-machine constructed in accordance with my invention. Fig. 2 is a top plan view with the hopper removed. Fig. 3 is a cross-sectional view on the line $a\ a$ of Fig. 2. Fig. 4 is a similar view on the line $b\ b$ of Fig. 2. Fig. 5 is an enlarged side elevation of the grain-feeding driving mechanism, taken on the line $c\ c$ of Fig. 2. Fig. 6 is a top plan view on the line $d\ d$ of Fig. 5. Fig. 7 is a cross-sectional view of a grain-drill, showing a modification of the clutch-operating device. Fig. 8 is a sectional view of one of the cups, taken on the line $e\ e$ of Fig. 5. Fig. 9 is a detail sectional view of one of the clutches. Fig. 10 is a sectional view on the line $f\ f$ of Fig. 9. Fig. 11 is a longitudinal sectional view of the yoke; and Fig. 12 is a detail view, partly in section, of the locking-arm employed for securing the hoe-elevating shaft.

Similar reference-numerals in the several figures indicate similar parts.

The machine embodies a main frame consisting of the side portions 1, provided with the bearing-brackets 2, in which is mounted the revoluble driving-shaft 3, carried in the wheels 4 and connected thereto for operation in one direction by an interlocking pawl and ratchet (indicated by 5) of any desired construction. The wheels are of the usual dished construction, and in order to arrange the bearing centrally of the rim the hubs 6 are provided on their outer sides with collars or extensions 7, suitable recesses being provided in the caps 8 to receive them. The caps are secured in position and prevented from removal from the shaft by means of pins 9, and in order to prevent the caps from turning on the shaft notches 13 are arranged in the edge of the cap diametrically opposite and adapted to embrace the pins 9, as will be understood. In practice I arrange in the ends of the caps a series of notches varying in depth, as shown, which permits a slight lateral adjustment sufficient to compensate for any variation in the castings and also to allow an adjustment in case of wear resulting from friction between the parts. This arrangement is practical and simple and permits the parts to be easily assembled and accurately adjusted without the necessity of employing set-screws.

At the forward end of the main frame are arranged the usual drag-shafts 15 15', to which the hoes 16 are attached by means of the drag-bars 17, the alternate hoes being connected to the opposite drag-shafts and suitable means being provided for operating the shafts, such as the segmental gears 18, whereby the hoes may be staggered when desired, as will be understood. At the rear of the frame is provided means for elevating the hoes out of contact with the ground, embodying a shaft 20, carrying at its ends segmental gears 21, meshing with racks 22, whereby as the shaft is revolved it will also be moved upwardly.

23 indicates flexible connections in the form of chains having rings 231 at the ends and attached to the hoes 16 and passing loosely through eyes or staples 24 in the shaft, permitting the hoes to be elevated separately by raising the rings 231, if desired. The racks 22 are formed upon brackets 26, attached to the side portions of the frame, and also provided in said brackets are slots 27, receiving pins 28 in the ends of the shaft 20 to guide the latter in its upward movement and hold the segmental gears in mesh with the racks, as shown in Fig. 2 and in dotted lines in Fig. 3. An operating-handle 30, attached to the shaft 20, normally extends vertically when the parts are in the lowermost and operative position, as shown in Fig. 4, being held in such a position by the weight of the shaft 20. When, however, the handle 30 is moved downward, the rotary movement of the shaft causes it to be elevated, when a stud 32, forming a shoulder thereon, engages in a recess 33 in the lower side of an arm 34, as shown in Fig. 12. The latter is pivoted at 35 to the rear side of the hopper and is permitted a limited movement, being normally held in its outward position by a spring 36. In order to provide means for automatically releasing the arm, a latch or member 37, pivoted at 38, is arranged in the recess 33, with its lower end 39 projecting below the edge of the arm 34, so that as the stud 32 is revolved into position it will engage the end of the latch, pushing it aside, when the spring 36 will force the arm downward and hold it in engagement with the stud; but when the handle 30 is moved downward still further the stud 32 will pass out of the recess, allowing the latter to be closed by the latch, when as the stud is returned over the edge of the arm the projection or stud 32 rides on the latch over the recess, and the shaft may be lowered to its normal position.

The hopper extends across the machine above the frame and is supported at its ends upon brackets or castings on the side portions 1 and is divided longitudinally into forward and rear compartments adapted to contain seed and fertilizer, respectively. In the bottom of each of these compartments are provided the distributing or feeding devices, operated in the usual manner by means of gear-wheels mounted on the shafts 40 and 41, extending longitudinally beneath the hopper and adapted to be operated by the revolving driving-shaft 3, as will be further described.

Mounted near the ends of the shaft 3 and adjacent to the bearing-brackets 2 are gears 43, Figs. 1, 2, and 9, supported on the shaft, but not positively connected therewith, and serving to operate the seed and fertilizer speed-governing devices, to be hereinafter more fully explained, and having at their inner sides recesses adapted to receive the angular shoulder 44, formed on the exterior of a clutch member 45, provided on its face with teeth 46, although other means of engagement forming interlocking projections between the proximate edges of the clutch member and gear may be employed. A similar clutch member 47 is arranged in opposition to the member 46, and its angular collar or extension 48 is inclosed in a recess in a cap 49, secured to the shaft 3 by a set-screw 50, so that as the shaft is revolved the gears 43 will normally be rotated with it, the two clutch members being normally held in engagement by means of a spring 51. In order that the clutch members may be disconnected and the feeding devices remain at rest when the hoes are out of operative position, forks 53 are arranged between the clutch members and provided with wedge-shaped ends 54, adapted as the forks are drawn rearwardly to separate the clutch members. This is automatically accomplished as the hoes are elevated by means of levers 55, having their rear ends extending over the shaft 20, pivoted at 58 and also pivoted at 59 to straps or bars 60, carrying the forks and adapted as the shaft is elevated to draw the wedges between the clutch members to separate them. Extending downwardly from the levers are fingers 61, adapted to be engaged by the shaft in its downward movement for returning the forks to their normal position, and as it is occasionally desirable to operate the seeding devices independently of the fertilizing-feeding mechanism and to permit the clutch members operating the latter to remain disengaged while the hoes are lowered into the operative position the finger 61, operating the fertilizer-feeding devices, is hinged to the lever and provided on its upper end with a projection 62, engaged by a latch 63, which may be removed to allow the finger to be moved out of the operative position, as shown in dotted lines in Fig. 4.

The variable-speed-gearing devices which are employed to operate the seeding devices are in the present instance mounted at the right-hand end of the machine, Figs. 1 and 2, a bar 65 extending between the side portions 1 of the frame and carrying a bracket 66, Fig. 1, supporting the inner end of a shaft 67, the opposite end of which is journaled in the side frame 1 and provided with a gear 68, meshing with a pinion 69, which latter is driven from the gear 43, carrying the clutch member 45, Figs. 2, 3, and 5. The pinion 69 is mounted on a stud 70, and an arm 71, secured by the nut 72 on the stud, embracing the hub of the gear 68, serves to hold the gear 68 against lateral movement on the shaft. The shaft 40, operating the seeding devices, extends longitudinally beneath the hopper and is provided with a gear 74, arranged between the arms of a yoke 75, journaled on the shaft 40, the outer end of the yoke being supported upon a segment 76 on the cross-bar 65 and adjustable relatively thereto by means of a pin 77, which may be engaged in a series of perforations 78. The central portion of the yoke is bent downwardly between its ends, and arranged in the proximate faces of the sides thereof are channels or ways 79, adapted to receive the ends of a journal-pin 80, on which is mounted two pinions 81 and 82, formed in a single casting, having different numbers of teeth and adapted to produce different speeds in the seeding-shaft as one or the other may be arranged to coöperate with the gear 74. In order to accommodate this adjustment, I provide a frame having the side portions 83, lying within the sides of the yoke 75, embracing the ends of the pin 80 and connected at their outer extremities by a bar 84 and also provided with outwardly-extending lugs 85, adapted to lie in the channel or way 79, to support the outer end of the frame. Cut-out portions or apertures 86 and 87 are provided in the upper side of the channels, as shown in Fig. 11, to permit the frame carrying the pinions 81 and 82 to be removed, when the pinions may be reversed and again inserted, so that whereas the smaller pinion 82 may be in mesh with the gear 74, as shown in Figs. 5 and 6, the larger pinion 81 may be arranged to coöperate with said gear when it is desired to change the speed of the seeding-shaft. Owing to the different diameters of the pinions 81 and 82, the pin 80 will occupy different positions in the channels 79 relative the shaft 73, and to lock it in position a gate 88 is pivoted in the yoke and provided with lips or projections 89 and 90, the latter lying in rear of the former and adapted to engage in rear of the bar 84 when the frame is in its outermost position, when the larger pinion is engaged with the gear 74 and the projections 89, operating to prevent the outward movement of the frame when the smaller pinion 82 is in the operative position, as shown in Fig. 5.

The rotary motion is imparted to the seeding-shaft by either of the pinions 81 or 82, which may be operated by any one of a series of gears 91 having different numbers of teeth and adjustable longitudinally of the shaft 67, the varying diameters of the gears being accommodated by the pivotal movement of the yoke 75 on the shaft 73. Pivoted to the bar 65 and in line with the yoke 75 is a spacing-plate 92, normally supported in a horizontal position in line with the shaft 67, said plate being provided with two apertures 93 and 94, (see Fig. 2,) which are in alinement with the pinions 81 and 82 and adapted to position one of the series of gears 91 and prevent its lateral movement when in mesh with either of the pinions carried by the yoke. At one side of the plate is an extension 95, serving to retain the remaining and inoperative gears of the series from becoming misplaced by jarring or jolting in case the machine is being operated upon hilly or uneven ground.

The arrangement of speed-gearing devices employed to operate the fertilizer-feeding mechanism is substantially identical with the devices just described save that the location of the fertilizer-shaft being in rear of the seeding-shaft I employ a driving-gear 96, operating upon a counter-shaft 97, carrying the pinion 98, and by locating the counter-shaft as shown I am enabled to employ a large driving-gear on the fertilizer-shaft, and thus reduce its rate of rotation to a proper speed relative that of the seeding-shaft. The yoke 99 is journaled on the counter-shaft and the arrangement of the mechanism and the operation of the parts are similar to those described for operating the seeding devices.

As is usual in machines of this kind, the seed and fertilizer are conducted to the hoes 16 by means of conveyers or tubes 100, suspended beneath a conically-shaped collar 101, forming part of the distributer-casing. To provide a simple means for supporting the collar, whereby it may be readily applied and removed, pins or lugs 102 and 102' are formed on opposite sides of the collar and adapted to project through apertures 103, formed in the sides of a top piece 104, loosely surrounding the collar 101 and to which the conveyer-tube is secured, as shown in Fig. 8. At the lower edge of one of the apertures is provided a way or passage 105, extending to the forward edge of the top piece and through which the pin 102' may be passed to either disengage or engage the conveyer by slightly raising the piece and turning it until the aperture is in line with the pin, the aperture in the opposite side having been first passed over its supporting-pin.

In Fig. 7 I have shown a cross-sectional view of a grain-drill in which the hoes are elevated by a lifting device arranged in front of the axle, embodying a shaft 110, journaled at its ends in brackets on the side portion 1 of the frame and having arms 111 thereon. Sleeves 112 are pivoted at the ends of the arms, and extending therethrough are rods 113, having their lower ends attached to the drag-bars 17. Arranged on the rods 113 and between the sleeves and pins 116 are coil-springs $116^X$, by means of which the hoes may be forced downwardly with a yielding pressure, as will be understood. Upon this form of machine the clutches are also operated from the shaft 110. This is accomplished by means of a bell-crank lever 117, pivoted at 118, attached at its lower end to the fork 53 and having at its upper end a cam 119. Mounted on the shaft 110 is a short arm carrying a pin 120, which bearing against the cam normally holds the lever in the forward position, as shown in Fig. 7; but when the shaft is rotated to raise the hoes the pin engaging the top of the cam moves it rearwardly, operating the fork and separating the clutch members.

The construction and arrangement of the devices described contribute to furnish a grain-drill combining the features of simplicity and practicability.

The construction of the wheel hubs or bearings and the caps and the method of securing the parts to the shaft are not claimed herein; but they are reserved to form the subject-matter of a subsequent application.

I claim as my invention—

1. In an agricultural machine, the combination with a frame having a hopper, feeding mechanism in the latter, a rotary driving-shaft, a driven shaft, and adjustable speed devices between said driven shaft and the feeding mechanism, of the hoes, elevating devices for raising the latter out of contact with the ground, a gear-wheel on the driving-shaft provided with lateral projections and connections between the gear-wheel and the driven shaft, a clutch member mounted on the driving-shaft and having projections interlocking with those on the gear-wheel, a movable clutch member carried on the driving-shaft, and means for disengaging the clutch members operated by the elevating devices when the hoes are raised out of the operative position.

2. In an agricultural machine, the combination with a frame, having a hopper, a feeding mechanism in the latter, a driving-shaft, a driven shaft, and speed devices arranged between the latter and the feeding devices, of the hoes normally in contact with the ground, elevating devices for raising the hoes, and a driving-gear loosely mounted on the driving-shaft for operating the driven shaft, having the hub provided with an irregular-shaped recess, a clutch member loosely mounted on the shaft having the irregular-shaped extension engaging the recess in the gear-hub, a movable clutch member carried on the driving-shaft and normally coöperating with the other member, and means arranged between the members operated by the elevating devices whereby the operation of the feeding device is arrested when the hoes are raised.

3. The combination with the frame, a revoluble shaft, the hoes connected to the latter and a shoulder on the shaft, of a pivoted latch adapted to engage the projection on the shaft to arrest its rotary movement in one direction, and a member on the latch coöperating with the projection to disengage the latch when the shaft is moved in the opposite direction.

4. The combination with the frame, a revoluble shaft the hoes connected thereto, and a shoulder on the shaft, of a pivoted latch, means for moving the latch relative the shaft to engage the shoulder thereon, and a releasing member operated, by the movement of the shaft in one direction, to hold the latch out of the path of the shoulder when the shaft is revolved in the opposite direction.

5. In an agricultural machine, the combination with a frame having the hoes, and the brackets on the frame having the guides and the racks, of the shaft arranged between the brackets having the gears engaging the racks and the pins moving in the guides, flexible connections between the shaft and hoes, and a handle for revolving the shaft, a projection on the shaft, a latch having an aperture engaging said projection to lock the shaft in the elevated position, and a finger on the latch adapted to close the aperture against the entrance of the projection therein when moving in one direction.

6. In an agricultural machine, the combination with a frame having a hopper, feeding devices in the hopper, and the hoes, upwardly-extending racks on the frame, the shaft connected to the hoes and having the gears engaging the racks, and means for revolving the shaft to elevate it upon the racks, of the driving-shaft, a loose clutch member thereon, and driving connections between the latter and the feeding devices, a laterally-movable clutch member carried on the shaft and coöperating with the former member, a disengaging device for moving said clutch member out of operative position, and a lever connected to said device having the fingers extending upon opposite sides of the hoe-elevating shaft whereby the clutch member will be positively operated by the raising and lowering of the shaft.

7. In an agricultural machine, the combination with a frame having a hopper, feeding devices in the hopper, and the hoes, brackets on the frame having upwardly-extending racks, the shaft guided on the brackets and having the gears engaging the racks, means for revolving the shaft to raise it on the brackets, and locking devices for securing it in the elevated position, of the driving-shaft, a loose clutch member carried thereon, driving connections between said member and the feeding devices, a second clutch member movably carried on the driving-shaft and coöperating with the first clutch member, and a lever having the fingers extending on opposite sides of the hoe-elevating shaft, and an arm attached to said lever having the end lying between the clutch members and adapted to separate them when moved out of the normal position.

8. In an agricultural machine, the combination with a frame having a hopper, feeding devices in the latter embodying a shaft and a driving-gear, and a driving-shaft on the frame, of a driven shaft operated from the latter carrying a gear, the two pinions adapted to engage singly with the gears on the feeding and driven shafts, a yoke having the arms extending upon opposite sides of the pinions adjustable relatively to the driven shaft and having the channels in the proximate faces of its arms, a journal-pin having its ends lying in the channels and supporting the pinions and means for preventing the movement of the pin in the channels.

9. In an agricultural machine, the combination with a frame having a hopper, a feeding-shaft arranged below the latter having the gear-wheel thereon, a driving-shaft on the frame, and a driven shaft operated from the latter carrying a gear-wheel, of the two pinions of different diameters mounted on a single journal and adapted to operate singly between the gear-wheels on the feeding and driven shafts, an adjustable yoke having the arms extending on opposite sides of the pinions and provided with channels in their proximate faces, and a pin forming a journal for both pinions having its ends lying in the channels, a frame having the side portions engaging the ends of the pin and provided with projections in rear of the pin lying in the channel, and a gate on the yoke engaging the frame to limit the rearward movement of the pinions.

10. In an agricultural machine, the combination with a hopper, a feeding-shaft located below the latter having the gear-wheel thereon, a driving-shaft on the frame, a driven shaft operated from the latter, and an adjustable yoke, of the pinions of different diameters journaled in the yoke and rigidly connected, one of said pinions being adapted to coöperate with the gear-wheel on the feeding-shaft, a series of gear-wheels mounted on the driven shaft movable longitudinally thereon and adapted to coöperate singly with either of the pinions, a plate hinged to the frame and provided with an aperture adapted to receive one of the gear-wheels on the driven shaft and retain it in line with one of the pinions, and means for adjusting the yoke relative the driven shaft.

11. In an agricultural machine, the combination with a hopper, a feeding-shaft having a driving-gear thereon, a driving-shaft on the frame, and a driven shaft operated thereby, of a yoke pivoted on the driven shaft, a pinion journaled in the yoke and coöperating with the gear on the driving-shaft, and a second pinion of a different diameter rigidly secured to the first, a series of differential pinions mounted on the shaft and movable longitudinally thereon, a plate having apertures in line with the pinions in the yoke adapted to receive one of the series of gears and position it in line with either of the pinions, and fingers at the sides of the plate holding the remaining gears of the series from passing beneath the yoke.

12. In an agricultural machine, the combination with a frame having a double hopper, feeding devices arranged in both hoppers and separate driving-shafts arranged beneath the hoppers, the operating gear-wheels on said shafts, the vehicle-wheels on the frame, and a revoluble axle on the frame connected to the wheels, of the separate driven shafts on the frame operated by the axle, separate clutch connections between the latter and said shafts, and intermediate pinions arranged between each of the driven shafts and the operating gear-wheels on one of the feeding-shafts, the hoes on the frame normally in contact with the ground, elevating mechanism for raising the hoes, and operating devices for each clutch, positive connections between one of said operating devices and the elevating mechanism, and adjustable connections between the other operating device and said elevating mechanism whereby the operation of either or both feeding devices, in the hopper, may be arrested upon the elevation of the hoes.

13. In an agricultural machine, the combination with the frame having the hopper provided with the feeding devices, the driving-shaft, and clutch connections between the latter and the feeding devices, of the hoes, the vertically-movable elevating-shaft mounted on the frame and connected to the hoes, the lever for operating the clutch, and the finger on the lever extending over the elevating-shaft and adapted to operate the lever to disengage the clutch when the shaft is raised, the finger pivoted on the lever and extending below said shaft, and a locking device for securing the finger in operative position to be normally engaged by the shaft in its downward movement.

14. In a seeding-machine, the combination with a hopper, and a feeding device therein embodying a distributer having the hollow collar provided with the oppositely-arranged pins or lugs, of a conveyer loosely surrounding the collar having at one side an aperture engaging one of the pins and at the opposite side a similar aperture adapted to engage the other pin and a passage leading from the aperture through which the pin may be passed to disengage the conveyer when the latter is tilted and revolved upon the former pin as an axis.

15. In a seeding-machine, the combination with a hopper, and a feeding device therein embodying a distributer having a hollow collar 101, and pins 102 and 102' arranged on opposite sides of the collar, of the conveyer having a tubular top piece 104 having at one side an aperture 103 engaging one of the pins and at the opposite side provided with a similar aperture adapted to engage the other pin and with a passage 105 leading from the latter aperture through which the said pin may be passed to engage and disengage the conveyer when the latter is tilted relative the collar.

16. In a machine such as described, the combination with a hopper having the two feeding devices, a driving mechanism, and separate clutch mechanism between the driving mechanism and feeding devices of the hoes, mechanism for elevating the latter, and the separate clutch-shifting devices for causing the operation of the clutches for the separate feeding devices controlled by the hoe-elevating mechanism.

17. In a machine such as described, the combination with a frame, a hopper thereon having two feeding-shafts, and a driving-shaft on the frame, the hoes, and a mechanism for elevating the latter, of separate clutch devices arranged between the driving-shaft and the feeding-shaft, separate operating devices controlled by the hoe-elevating mechanism to disconnect the clutches when the hoes are elevated, and means adjustable relatively to one of the operating devices whereby one of the clutches may be operated independently of the other when the hoes are in the operative position.

18. In a machine such as described, the combination with a frame having a hopper provided with a feeding-shaft, and a driving-gear thereon, a driving-shaft on the frame, a driven shaft operated from the driving-shaft, and a driving-gear thereon, of an adjustable yoke having the arms, differential pinions removably and interchangeably mounted in the yoke whereby either of said pinions may coöperate with the driving-gears on the feeding and driven shafts.

19. In a seeding-machine, the combination with a feeding mechanism having an operating-gear, a main driving-gear, and a shiftable gear driven from the main driving-gear, of differential pinions adapted to coöperate with the shiftable gear and the operating-gear of the feeding mechanism, a yoke supporting the pinions, and a removable journal for the differential pinions adjustable on the yoke whereby the position of the pinions may be reversed and devices for securing the journal on the yoke.

20. The combination with the frame having a hopper, feeding devices in the latter embodying a shaft having a driving-gear, and a driving-shaft on the frame, of a driven shaft operated from the former carrying a gear, a yoke adjustable relative the driving-shaft having the arms provided with the channels in their proximate faces, a pinion having the journal-pins lying in the channels in the yoke, and devices for adjusting the pinion on the yoke to cause its engagement with the gears on the feeding and driven shafts.

ALBERT ARMITAGE.

Witnesses:
WILLIAM P. THISTLETHWAITE,
G. WILLARD RICH.